(12) United States Patent
Storaasli

(10) Patent No.: US 7,203,405 B1
(45) Date of Patent: Apr. 10, 2007

(54) OPTICAL FIBER CABLE WITH STRATEGICALLY PLACED FILLER RODS

(75) Inventor: Olaf L. Storaasli, Hickory, NC (US)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/255,926

(22) Filed: Oct. 24, 2005

(51) Int. Cl.
*G02B 6/44* (2006.01)

(52) U.S. Cl. ............. 385/113; 385/109; 385/111; 385/112

(58) Field of Classification Search .......... 385/113
See application file for complete search history.

(56) References Cited

U.S. PATENT DOCUMENTS

| | | | |
|---|---|---|---|
| 6,066,397 A | | 5/2000 | Risch et al. |
| 6,085,009 A | * | 7/2000 | Risch et al. ............ 385/109 |
| 6,210,802 B1 | * | 4/2001 | Risch et al. ............ 428/398 |
| 6,350,947 B1 | * | 2/2002 | Bertini et al. ........... 174/47 |
| 6,355,879 B1 | * | 3/2002 | Bertini et al. ........... 174/47 |
| 2002/0162674 A1 | * | 11/2002 | Bertini et al. ........... 174/47 |
| 2003/0082380 A1 | * | 5/2003 | Hager et al. ............ 428/375 |
| 2004/0071416 A1 | | 4/2004 | Militaru |
| 2005/0013566 A1 | * | 1/2005 | Storaasli et al. ........ 385/113 |

* cited by examiner

*Primary Examiner*—Frank G. Font
*Assistant Examiner*—Mary El-Shammaa
(74) *Attorney, Agent, or Firm*—Sughrue Mion, PLLC

(57) ABSTRACT

An optical fiber cable including a central strength member extending longitudinally; a plurality of buffer tubes housing optical fibers and stranded around the strength member; a pair of filler elements stranded around the strength member along with the buffer tubes and arranged such that one filler element of the pair is diametrically opposite the other filler elements of the pair to protect the buffer tubes when the cable is subjected to a radially inward force; and an outer sheath surrounding the buffer tubes and filler elements.

15 Claims, 3 Drawing Sheets

OPTICAL FIBER CABLE WITH STRATEGICALLY PLACED FILLER RODS

BACKGROUND OF THE INVENTION

The invention relates to an optical fiber cable having filler rods that are strategically placed to protect the optical fibers located in buffer tubes.

As smaller and higher fiber density fiber optic cables have become emphasized, overall cable strength and robustness have been sacrificed. Outer sheath thicknesses have been reduced, strength elements have been reduced, and buffer tube sizes have been reduced, all in an effort to reduce both the cost and size of fiber optic cables. In order to continue to meet standard industry requirements as well customer expectations in terms of strength and robustness, yet have a smaller cable, a novel approach is needed.

The invention is particularly applicable to stranded loose tube cables in which buffer tubes are stranded around a central strength member. In these types of cables, it is very common to use filler elements, also known as filler rods, in place of buffer tubes, when buffer tubes are not necessary for a particular design.

FIG. 1 shows a conventional stranded loose tube cable 8 having a central strength member 10, buffer tubes 12 housing optical fibers 14, and a sheath 16. The cable has six positions for receiving buffer tubes 12, each having twelve optical fibers 14 for a total fiber count of 72. FIG. 2(a) shows a related optical fiber cable 8 with four buffer tubes 12 and two filler elements 18 that fill the void of omitted buffer tubes for a total fiber count of 48. Traditionally, the filler elements 18 are placed in the last two positions, adjacent each other as shown in FIG. 2(a). As a result, the filler elements 18 are diametrically opposite the buffer tubes 12. Also, U.S. Patent Publication No. 2004/0071416 discloses a cable having three filler elements that are diametrically opposite respective buffer tubes.

FIG. 2(b) is a schematic view of the FIG. 2(a) cable 8 showing the effect of a crush load applied to the cable. The filler elements 18 are typically more rigid than the buffer tubes 12. The relatively soft buffer tubes 12 are more likely to deform than rigid filler elements 18, whereas the more rigid filler elements 18 are more likely to resist load. As shown in FIG. 2(b), when the filler elements 18 are placed in the last two positions, adjacent to each other, the load will travel through the most rigid members first. In this case, load path will be through the buffer tubes 12 and filler elements 18. The buffer tubes 12 opposite the filler elements 18 will support the load, and deform if the load is greater than the strength of the buffer tubes 12. In the cable of FIG. 2(b), the buffer tubes 12 opposite the filler elements 18 will be deformed more than the other buffer tubes that oppose each other thus jeopardizing the optical fibers in the buffer tube.

SUMMARY OF THE INVENTION

The invention is preferably directed to an optical fiber cable, comprising a central strength member extending longitudinally; a plurality of buffer tubes housing optical fibers and stranded around the strength member; a pair of filler elements stranded around the strength member along with the buffer tubes and arranged such that one filler element of the pair is diametrically opposite the other filler elements of the pair so as to protect the buffer tubes when the cable is subjected to a radially inward force; and an outer sheath surrounding the buffer tubes and filler elements. The cable may include any number of filler elements although it is preferred that the filler elements be arranged in pairs in which one filler element of the pair opposes the other filler element of the pair. Also, as a substitute for a filler element, the cable can include a metallic toning wire for locating the cable underground.

DETAILED DESCRIPTION OF THE INVENTION

Figure 1:
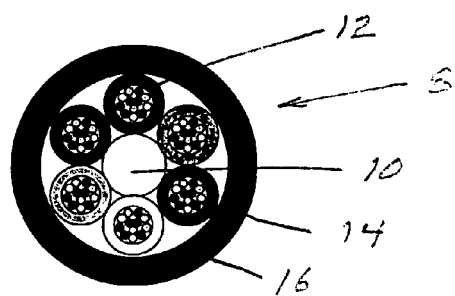
FIG. 1 is a cross-sectional views of related optical fiber cable showing the orientation of the buffer tubes.
Figure 2A:
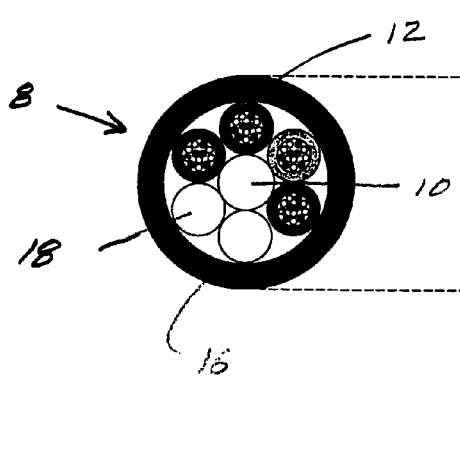
FIG. 2(a) is a cross-sectional view of a related optical fiber cable showing the orientation of the filler elements and buffer tube and FIG. 2(b) is a schematic illustration showing the loading on the cable of FIG. 2(a)
Figure 2B:
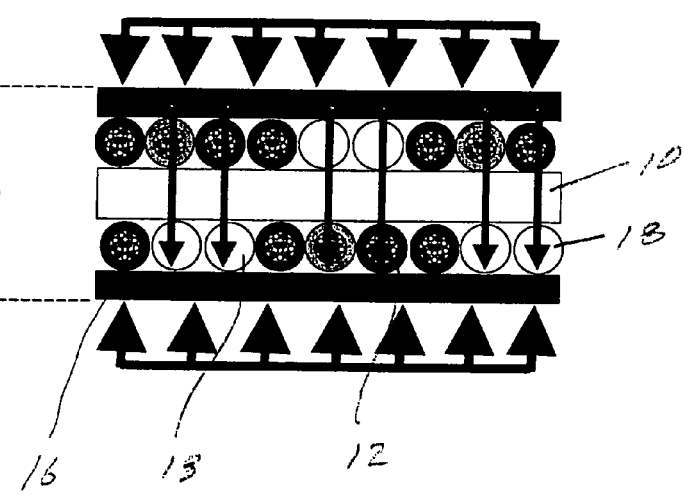
Figure 3A:
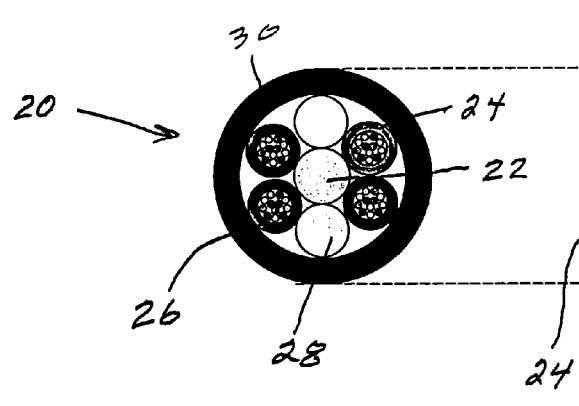
FIG. 3(a) is a cross-sectional view of an optical fiber cable according to a first embodiment of the invention and FIG. 3(b) is a schematic illustration showing the loading on the cable of FIG. 3(a)
Figure 3B:
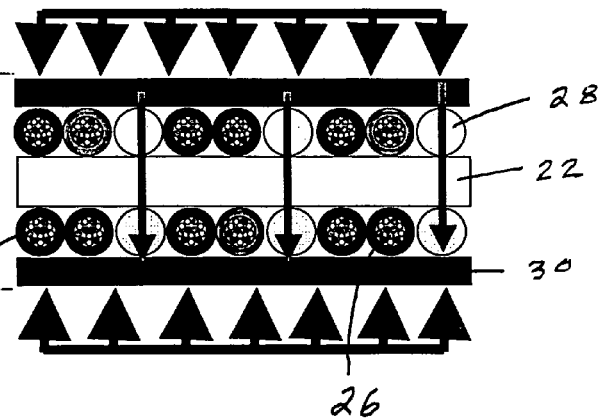

FIG. 3(a) is a cross-sectional view of the optical fiber cable 20 according to a first embodiment of the invention. The cable includes a central strength member 22 extending longitudinally, a plurality of buffer tubes 24 stranded around the strength member 22 and housing optical fibers 26, a pair of filler elements 28 stranded along with the buffer tubes 24 around the strength member 22 and an outer sheath 30. The filler elements occupy the space of omitted buffer tubes so that the structural integrity of the cable is not sacrificed. According to the invention, the filler elements 28 are arranged so that one of the filler elements is diametrically opposite the other filler element and preferably at substantially the same radial distance from the central strength member as the buffer tubes. With reference to FIG. 3(b), when the filler elements are placed opposite each other, the transverse load is transferred primarily through the filler elements 28, not the buffer tubes 24. Because the filler elements 28 are much more rigid than the buffer tubes 24, there will be much less overall deformation of the cable 20 than with the traditional filler rod placement. Under such a scenario, the buffer tubes are protected, essentially in a shell, by the filler elements. By strategically positioning these filler elements, the forces on the buffer tubes and fibers are minimized. Further, since there is preferably no filler element opposing a buffer tube, a single buffer tube will not absorb all of the force exerted radially with respect to the buffer tube. Rather, the force will be absorbed by the two buffer tubes that oppose each other.

According to the invention, the filler elements 28 are conventional and made of a polymeric material such as polyethylene or polypropylene. Similarly, the central strength member 22, buffer tubes 24 and outer sheath 30 are conventional. It is noted that while the invention has been illustrated and described with six spaces for the buffer tube such that the total number of buffer tubes and filler elements equals six, the invention is not restricted in this regard.

Figure 4:
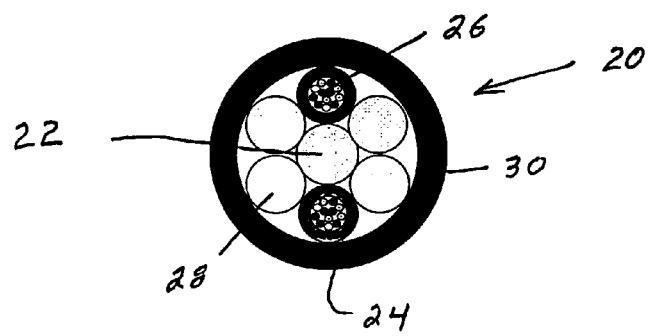
FIG. 4 is a cross-sectional view of an optical fiber cable according to a second embodiment of the invention.
Figure 5:
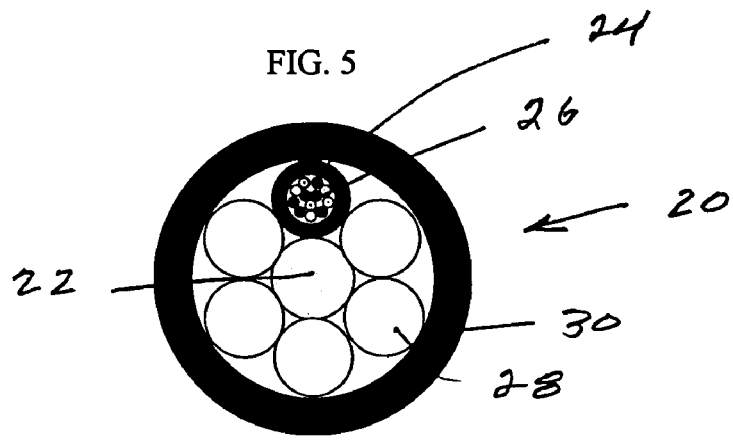
FIG. 5 is a cross-sectional view of an optical fiber cable according to a third embodiment of the invention.
Figure 6:
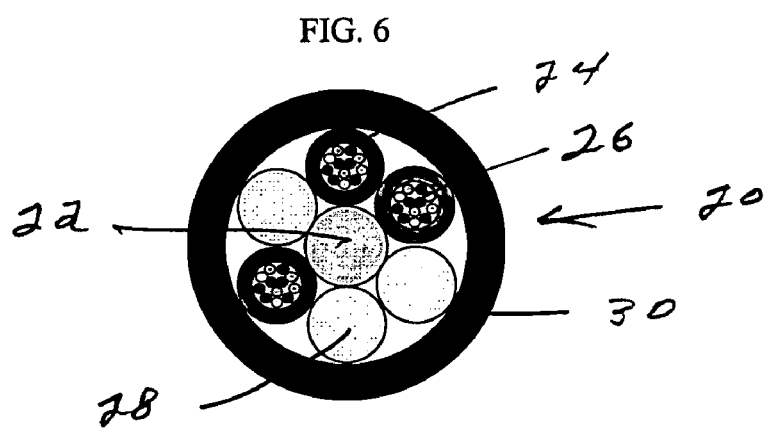
FIG. 6 is a cross-sectional view of an optical fiber cable according to a fourth embodiment of the invention.

FIGS. 4–6 show other embodiments of the invention in which filler elements are strategically located to protect the fibers in the buffer tubes. Whenever there are multiple filler elements, they should always be placed opposite another filler element. FIG. 4 shows a cable that includes two buffer tubes 24 and two pairs of filler elements 28, according to a second embodiment of the invention. The pairs of filler elements 28 are arranged such that one of filler element of the pair opposes the other filler element of the pair to protect the buffer tubes. Specifically, the filler elements 28 will be load carrying members, and the buffer tubes 24 will be protected. It is preferable that the cable include an even number of filler elements so that they can be arranged in pairs with the filler elements of each pair opposing each other. This way, a buffer tube is not opposed by a filler element.

However, the invention is not limited in this respect. For example, FIGS. 5 and 6 show other cables 20 in which there are an odd number of buffer tubes 24 and filler elements 28. More specifically, the cable in FIG. 5, according to a third embodiment of the invention, includes one buffer tube 24 and five filler elements 28, and the cable 20 in FIG. 6, according to a fourth embodiment, includes three buffer tubes 24 and three filler elements 28. Like the previous embodiments, the buffer tubes 24 house optical fibers 26 and the cable is surrounded by an outer sheath 30. As noted above, as with the previous embodiments, the filler elements are arranged in pairs where one of the filler elements of the pair opposes the other filler element. However, since these embodiments contemplate an additional filler element, this filler element is opposed by a buffer tube. Nonetheless, since there is at least one pair of opposing filler elements, these filler elements will provide improved protection of all of the buffer tubes.

Figure 7:
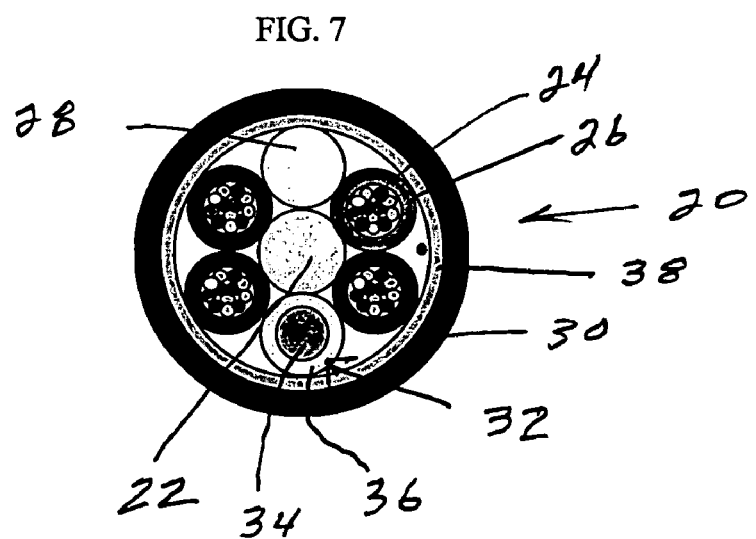
FIG. 7 is a cross-sectional view of an optical fiber cable according to a fifth embodiment of the invention.

It is also possible to have other rigid elements within the cable, such as metallic toning wires. FIG. 7 illustrates a cable according to yet another embodiment of the invention that includes four buffer tubes 24, a metallic toning wire 32 and a filler element 28. In this embodiment, the rigid metallic toning wire 32 is placed opposite the filler element 28 to provide added protection for the buffer tubes. The metallic toning wire provides cable locating ability and includes a wire 34 surrounded by an insulation 36. This cable 20 in embodiment is shown with an inner jacket 38, which is conventional.

Trial cables have been manufactured and have shown the necessary robustness during manufacture and during testing. All cables manufactured using the filler rod strategic placement have been tested multiple times and have passed industry standard crush and impact tests. (Telcordia GR20, RUS (REA) PE-90. Another common test within the industry is a sheave test, in which a tensioned cable is passed over a sheave, simulating a real-world installation. Without use of strategic filler rod placement, these cables are at risk of failing this test. All cables that were manufactured with strategic filler rod placement according to the invention and have been subjected to the sheave test, have passed. No failures have been observed to date.

What is claimed is:

1. An optical fiber cable, comprising:
   a central strength member extending longitudinally;
   a plurality of buffer tubes housing optical fibers and stranded around the strength member;
   a pair of filler elements stranded around the strength member along with the buffer tubes and arranged such that one filler element of the pair is diametrically opposite the other filler elements of the pair; and
   an outer sheath surrounding the buffer tubes, filler elements and central strength members wherein the filler elements are more rigid than the buffer tubes.

2. The optical fiber cable of claim 1, further comprising another pair of filler elements stranded around the strength member and arranged such that one filler element of the another pair is diametrically opposite the other filler element of the another pair.

3. The optical fiber cable of claim 1, wherein the filler elements include a polymeric material.

4. The optical fiber cable of claim 1, wherein one of the filler elements includes a polymeric material and the other of the filler elements include a metallic toning wire.

5. The optical fiber cable of claim 2, wherein the filler elements include a polymeric material.

6. The optical fiber cable of claim 2, wherein one of the filler elements includes a polymeric material and the other of the filler elements include a metallic toning wire.

7. The optical fiber cable of claim 1, wherein said filler elements are disposed at substantially the same radial distance from the strength member as the buffer tubes.

8. The optical fiber cable of claim 1, wherein the cable includes four of said buffer tubes and two of said filler elements.

9. The optical fiber cable of claim 2, wherein the cable includes two of said buffer tubes and four of said filler elements.

10. The optical fiber cable of claim 1, wherein all filler elements are diametrically opposed by another filler element.

11. The optical fiber of claim 1, wherein the plurality of buffer tubes are arranged in pairs with one buffer tube of the pair being diametrically opposite the other buffer tube of the pair.

12. The optical fiber cable of claim 3, wherein the polymeric material includes polyethylene.

13. The optical fiber cable of claim 5, wherein the polymeric material includes polyethylene.

14. The optical fiber cable of claim 3, wherein the polymeric material includes polypropylene.

15. The optical fiber cable of claim 5, wherein the polymeric material includes polypropylene.

* * * * *